(12) United States Patent
Van Engelen

(10) Patent No.: US 9,713,792 B2
(45) Date of Patent: Jul. 25, 2017

(54) COMPOSITE MEMBRANES

(75) Inventor: Johannes Adrianus Wilhelmus Van Engelen, Tilburg (NL)

(73) Assignee: Fujifilm Manufacturing Europe BV (NL)

(*) Notice: Subject to any disclaimer, the term of this patent is extended or adjusted under 35 U.S.C. 154(b) by 311 days.

(21) Appl. No.: 14/234,526

(22) PCT Filed: Jul. 5, 2012

(86) PCT No.: PCT/GB2012/051570
§ 371 (c)(1),
(2), (4) Date: Mar. 14, 2014

(87) PCT Pub. No.: WO2013/014420
PCT Pub. Date: Jan. 31, 2013

(65) Prior Publication Data
US 2014/0305863 A1 Oct. 16, 2014

(30) Foreign Application Priority Data

Jul. 25, 2011 (GB) .................................. 1112725.5
Sep. 28, 2011 (GB) .................................. 1116703.8

(51) Int. Cl.
*B01D 39/00* (2006.01)
*B01D 39/14* (2006.01)
(Continued)

(52) U.S. Cl.
CPC ....... *B01D 67/0002* (2013.01); *B01D 61/366* (2013.01); *B01D 61/42* (2013.01);
(Continued)

(58) Field of Classification Search
CPC ............ B01D 67/0088; B01D 67/0093; B01D 69/125; B01D 2325/14; B01D 2323/34;
(Continued)

(56) References Cited

U.S. PATENT DOCUMENTS 4,133,917 A 1/1979 Wallsten
4,464,432 A 8/1984 Dost et al.
(Continued)

FOREIGN PATENT DOCUMENTS

CN 102008898 A 4/2011
EP 1737000 A1 12/2006
(Continued)

OTHER PUBLICATIONS

International Preliminary Report on Patentablity issued from corresponding PCT/GB2012/051570, dated Jan. 28, 2014.

*Primary Examiner* — Ana Fortuna
(74) *Attorney, Agent, or Firm* — Banner & Witcoff, Ltd.

(57) ABSTRACT

A process for making a composite membrane comprising the steps: (i) providing a moving poriferous support (1) impregnated with a curable composition, wherein the composition is present in the pores of the support and on a surface of the support; (ii) scraping or squeezing the poriferous support and thereby removing at least some of the curable composition (2) from the surface of the support; and (iii) after performing step (ii), irradiating the support, thereby curing the composition present therein. Composite membranes are also claimed having a surface layer thickness of below 0,5 microns.

17 Claims, 1 Drawing Sheet

(51) Int. Cl.

| | | |
|---|---|---|
| *B29C 65/00* | (2006.01) | |
| *B05D 5/00* | (2006.01) | |
| *B01D 67/00* | (2006.01) | |
| *B01D 69/02* | (2006.01) | |
| *B01D 69/12* | (2006.01) | |
| *B01D 61/36* | (2006.01) | |
| *B01D 61/42* | (2006.01) | |
| *C25B 13/08* | (2006.01) | |
| *H01M 8/1016* | (2016.01) | |

(52) U.S. Cl.
CPC ....... *B01D 67/0006* (2013.01); *B01D 67/009* (2013.01); *B01D 69/02* (2013.01); *B01D 69/125* (2013.01); *C25B 13/08* (2013.01); *H01M 8/1016* (2013.01); *B01D 2323/30* (2013.01); *B01D 2323/34* (2013.01); *B01D 2323/345* (2013.01); *B01D 2323/42* (2013.01); *B01D 2325/04* (2013.01); *B01D 2325/14* (2013.01); *B01D 2325/16* (2013.01); *B01D 2325/42* (2013.01)

(58) Field of Classification Search
CPC ................ B01D 67/009; B01D 15/362; B01D 2323/385; B05C 11/041; B29C 2035/0827; B29C 35/10; B29C 70/504
See application file for complete search history.

(56) References Cited

U.S. PATENT DOCUMENTS

| | | | |
|---|---|---|---|
| 4,608,393 A | 8/1986 | Hamano | |
| 4,644,900 A | 2/1987 | Poterala | |
| 4,757,782 A | 7/1988 | Pullinen | |
| 5,013,448 A | 5/1991 | Swamikannu | |
| 5,017,292 A | 5/1991 | DiLeo et al. | |
| 5,035,943 A | 7/1991 | Kinlaw et al. | |
| 5,264,125 A | 11/1993 | MacDonald et al. | |
| 5,368,889 A * | 11/1994 | Johnson | B01D 69/125 427/244 |
| 5,974,974 A | 11/1999 | Agnew et al. | |
| 6,451,386 B1 | 9/2002 | Simonetti | |
| 6,666,946 B2 | 12/2003 | Pekurovsky et al. | |
| 6,677,000 B2 | 1/2004 | Neuhaus-Steinmetz et al. | |
| 6,783,937 B1 | 8/2004 | Hou et al. | |
| 7,648,034 B2 | 1/2010 | Charkoudian et al. | |
| 7,649,025 B2 | 1/2010 | Kitamura et al. | |
| 7,674,349 B2 | 3/2010 | Hiraoka et al. | |
| 8,128,843 B2 | 3/2012 | Umebayashi et al. | |
| 8,147,921 B2 | 4/2012 | Umebayashi et al. | |
| 2001/0031594 A1 | 10/2001 | Perez et al. | |
| 2002/0068162 A1* | 6/2002 | Carrier | B08B 1/00 428/293.4 |
| 2002/0174966 A1* | 11/2002 | Brauns | B32B 5/28 162/280 |
| 2003/0140942 A1* | 7/2003 | Rajala | B08B 1/008 134/6 |
| 2003/0143338 A1 | 7/2003 | Neuhaus-Steinmetz et al. | |
| 2004/0012118 A1 | 1/2004 | Perez et al. | |
| 2008/0011676 A1 | 1/2008 | Olson | |
| 2008/0216942 A1* | 9/2008 | Hiraoka | B01D 67/0088 156/145 |
| 2009/0004548 A1 | 1/2009 | Hiraoka | |
| 2009/0050558 A1* | 2/2009 | Ishizuka | B01D 67/0006 210/500.21 |
| 2009/0098359 A1 | 4/2009 | Waller, Jr. et al. | |
| 2010/0129650 A1 | 5/2010 | Mayan et al. | |
| 2010/0221309 A1 | 9/2010 | Myers et al. | |
| 2010/0261801 A1 | 10/2010 | Weiss et al. | |
| 2011/0091790 A1 | 4/2011 | Barnwell et al. | |
| 2011/0097645 A1 | 4/2011 | Van Baak et al. | |
| 2012/0165420 A1* | 6/2012 | Bhikhi | B01D 67/0006 521/27 |
| 2012/0292249 A1* | 11/2012 | Wang | B01D 67/0006 210/500.33 |
| 2013/0056415 A1 | 3/2013 | Kozlov et al. | |
| 2014/0349227 A1* | 11/2014 | Nauka | G03G 5/147 430/56 |

FOREIGN PATENT DOCUMENTS

| | | |
|---|---|---|
| EP | 1808220 A1 | 7/2007 |
| WO | 2010/098867 A1 | 9/2010 |
| WO | 2011/027138 A1 | 3/2011 |

* cited by examiner

COMPOSITE MEMBRANES

RELATED APPLICATION DATA

This application is a National Stage Application under 35 U.S.C. 371 of co-pending PCT application PCT/GB2012/051570 designating the U.S. and filed Jul. 5, 2012; which claims the benefit of GB application number 1116703.8 and filed Sep. 28, 2011 and GB application number 1112725.5 and filed Jul. 25, 2011 each of which are hereby incorporated by reference in their entireties.

This invention relates to a process for the preparation of composite membranes, to composite membranes and to the uses of such membranes.

Composite membranes are in demand for a wide variety of separation process. For example, composite membranes may be used as gas-permeable membranes for separating a first gas from a second gas or as an essentially water-impermeable and ion-permeable membrane in ion exchange processes.

There is a need for fast and efficient processes for the production of composite membranes. Ideally such membranes are thin and have minimal defects. Desirably the membranes—when used as ion exchange membranes—have good permselectivity and low electrical resistance.

Additionally the membranes are desired to be strong, while at the same time being flexible. Flexibility is required for membranes which are to be wound into tight circumferential structures. The membranes also need to retain their physical integrity over an extended period of time. Desirably the method used to prepare the membranes does not result in excessive curl. It is also desirable for the membranes to be resistant to the chemicals that they can come into contact with, e.g. resistant to hydrolysis.

Membrane users require high quality membranes at the lowest prices possible. This means production processes for composite membranes are ideally inexpensive, stable and durable and the membranes should be easily capable of mass production.

US 2008/216942 ("Hiraoka") describes a method for the continuous production of functional membranes in which a functional polymer precursor is filled into the pores of a poriferous support and then cured, e.g. by irradiation. However the method is expensive for a number of reasons. Firstly, the Hiraoka process sandwiches the poriferous membrane carrying the polymer precursor between two outer films. This adds to the complexity of machinery used to prepare composite membranes, increases the required amount of consumables (i.e. the two outer films) and thereby increases manufacturing costs. Also excess polymer is removed after the polymerization step; this material cannot be recycled and thus forms waste which increases manufacturing costs. Removal of excess polymer after the polymerization step can also lead to membranes having surface defects and low durability.

EP 222,926, U.S. Pat. Nos. 5,145,618, 5,264,125, WO 200778880, EP 1,315,555 and EP 1,381,447 describe processes for producing membranes which includes a sandwiching step.

There is a need for a process for making composite membranes which overcome some or all of the above shortcomings and provides composite membranes having desirable properties.

SUMMARY

According to a first aspect of the present invention there is provided a process for making a composite membrane comprising the steps:

(i) providing a moving poriferous support impregnated with a curable composition, wherein the composition is present in the pores of the support and on a surface of the support;
(ii) scraping or squeezing the poriferous support and thereby removing at least some of the curable composition from the surface of the support; and
(iii) after performing step (ii), irradiating the support, thereby curing the composition present therein.

DETAILED DESCRIPTION

Figure 1:
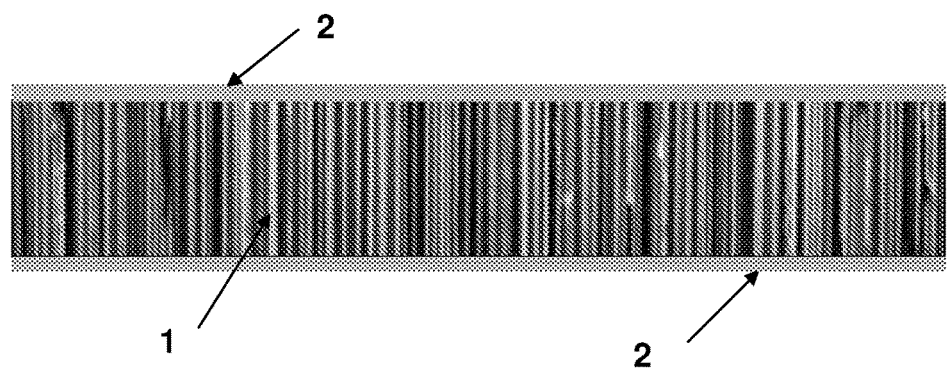
FIG. 1 is a schematic of a poriferous support having first and second surfaces on opposite sides.

The present process allows composite membranes to be made in continuous processes at high speeds in a cost effective way.

A frequently occurring drawback of using cheap raw materials to make composite membranes is the unpredictable fluctuation in their quality levels. For example, their homogeneity, thickness and/or purity can vary widely from one batch to another. Sometimes these fluctuations require adjustments to the composite membrane manufacturing process. For example, thickness variations in the poriferous support may lead to thickness variations of materials applied to the support which may in turn lead to unacceptable variations in quality of the resultant composite membrane.

The present invention allows high quality composite membranes to be produced without internal strain variations in the final product. Such internal strain variations due to local differences in swelling behaviour may be responsible for membranes having undesirable temperature- and humidity-dependent curling. Wet curling behaviour appears very sensitive to deviations in the symmetry of the composite membrane, especially when the cured polymer located in pores of the poriferous support exhibits stronger swelling than the polymeric support itself. A highly symmetrical structure is therefore preferred. By carefully removing part of the curable composition from the surface(s) of the impregnated poriferous support a composite membrane can be made that is symmetrical throughout its depth.

For ion exchange ("IE") membranes, there is a particular need for high quality composite membranes. In particular, it is desirable for IE membranes to be smooth, thin, flexible, strong, non-curling and substantially free from coating defects. The present process can be used to provide such properties without sandwiching the impregnated poriferous support between sheets (e.g. of irradiation-transparent material) during curing step (iii).

The present process allows the manufacture of highly symmetrical composite membranes, such membrane being easy to handle and very suitable for application as water vapour-permeable membrane, e.g. for outdoor clothing.

The poriferous support may be, for example, a woven or non-woven substrate. Examples of non-woven substrates include wetlaid and drylaid non-woven material, spunbond and meltblown fabrics, extruded films and nanofiber webs.

Preferred non-woven poriferous supports comprise a sheet or web of tightly bound fibres or filaments (e.g. filaments of length 5 to 25 mm) with gaps between the fibres or filaments constituting the 'pores' of the poriferous support. The curable composition may permeate into these pores and usually an excess of the curable composition sits on a surface of the poriferous support. Step (ii) of the process scrapes-off the excess curable composition before the curing step, typically leaving the outermost fibres/filaments substantially free from curable composition but with the curable composition still being present between the fibres/filaments and also deeper-down within the pores of the non-woven poriferous support formed from gaps between the fibres or filaments.

Preferably step (ii) is performed such that the pores of the poriferous support are completely filled with the curable composition and air is pressed out as much as possible. In this way, the water-permeability can be reduced and this is useful for achieving the preferred, very low water-permeability described below.

The chemical constitution of the support is not particularly limited, for example the support may be made from polyethylene, polypropylene, and other polyolefin-based resins; polyvinyl chloride, vinyl chloride-vinyl acetate copolymers, vinyl chloride-vinylidene chloride copolymers, vinyl chloride-olefin copolymers, and other vinyl chloride-based resins; polyethylene/polypropylene copolymer, polyimide, polyacrylonitrile, polyester, polyvinylidenefluoride, polyvinylidenedifluoride/polytetrafluoroethylene fluorocopolymer, poly(hexafluoropropylene), poly(chlorotrifluoroethylene), polytetrafluoroethylene, polytrifluoroethylene, poly(tetrafluoroethylene-hexafluoropropylene), poly(tetrafluoroethylene-perfluoroalkylether), and other fluorine-based resins; and nylon 6, nylon 66, and other polyamide resins, including aromatic polyamides, as well as aromatic polyimides, aramids, polysulfones, polyether ether ketones, copolymers thereof, and the like.

Particularly suitable materials are e.g. polyethylene, polypropylene, and copolymers thereof.

The poriferous support is preferably a polyolefin-based polymer because such polymers are inexpensive and have good mechanical strength, reasonable chemical resistance and other desirable characteristics.

If desired the poriferous support may be a chemical- or radiation-treated polymer, e.g. a polymer which has been subjected to plasma treatment, electron beam irradiation, corona treatment, chemical cross-linking by a cross-linking agent, or the like in order to modify its properties.

The porosity of the poriferous support before the curable composition has been applied thereto is dependent upon the type of support and the end properties desired for the composite membrane, but is preferably 5 to 95%. A porosity of 5 to 90% is particularly preferred, and 20 to 80% is more preferred. The preferred range for the average pore diameter is 0.1 to 10,000 µm. An average pore diameter of 1 to 1,000 µm is particularly preferred.

The variation in thickness of the support across its length and breadth is preferably +/−10% or less, and more preferably +/−5% or less.

The tensile strength of the support is not specifically limited and is preferably 100 to 5,000 N/m, more preferably 250 to 3,000 N/m.

From cost point of view, polymeric non-woven supports are preferred, either drylaid or wetlaid. Often non-woven supports suffer from thickness variations and inhomogeneities in both surface and interior of the material. Examples of such inhomogeneities are voids and impurities. When present at the surface these inhomogeneities may cause local variations in surface energy which may lead to coating defects. By tuning the process parameters (e.g. process speed, pass roller position, viscosity and surface tension of the curable composition) the occurrence of coating defects can be prevented or reduced.

Various porous supports are available commercially, e.g. from Freudenberg Filtration Technologies (Novatexx™ materials) and from Sefar AG.

Preferably the support has a high surface energy, preferably higher than 50 mN/m, more preferably higher than 55 mN/m, especially higher than 60 mN/m. For a good wetting the surface energy of the support is preferably at least 10 mN/m higher than the surface tension of the curable composition. When desired the surface energy of the support may be modified by a chemical treatment (e.g. by applying a wetting agent, a surfactant, grafting chemical groups onto the fibres, fluorination), by a physical treatment (e.g. corona discharge, plasma glow, UV irradiation, flame, heat) or by a combination of such methods.

The poriferous support, before impregnation, preferably has a thickness (i.e. average thickness) of 20 to 500 µm, more preferably 40 to 250 µm, especially 50 to 200 µm, e.g. 60, 80, 100, 120, 160 or 180 µm.

Preferably the density of the support, before impregnation, is 10 to 140 g/m$^2$ (GSM), more preferably between 20 and 120 g/m$^2$, especially between 25 and 110 g/m$^2$, e.g. 30 or 40 or 50 or 60 or 70 or 80 or 90 or 100 g/m$^2$. The fibre density for woven supports is preferably 100 to 1000 kg/m$^3$, more preferably 200 to 700 kg/m$^3$, e.g. about 300, about 400, about 500 or about 600 kg/m$^3$.

The curable composition preferably has a low viscosity because this assists rapid impregnation into the poriferous support and can lead to higher production speeds.

In order to produce a sufficiently flowable curable composition for application by a high speed coating machine which impregnates the porous support sufficiently, it is preferred that the curable composition has a viscosity below 5000 mPa·s when measured at 50° C., more preferably below 1500 mPa·s when measured at 50° C. Most preferably the viscosity of the curable composition is from 2 to 500 mPa·s when measured at 50° C. Especially preferred is a viscosity from 2 to 150 mPa·s, e.g. between 30 and 100 mPa·s or 50 and 100 mPa·s when measured at 50° C.

The curable composition preferably has a low surface tension because this can also assist rapid impregnation into the poriferous support and can lead to higher production speeds. The surface tension of the curable composition is preferably lower than 50 mN/m, more preferably lower than 40 mN/m, especially lower than 35 mN/m.

The chemical characteristics of the curable composition may be selected depending on the desired properties for the end composite membrane. Typically the curable composition comprises monomers and/or oligomers that can be cured by irradiation to form a polymeric resin. When used as a gas or vapour permeable membrane or as an ion permeable membrane the polymeric resin is preferably not a macroporous gel but is essentially non-porous, e.g. not liquid permeable. By "essentially non-porous" we mean a composite membrane having low water permeability, for example the very low water permeability mentioned below. Preferably the curable composition fills the pores of the poriferous support, with no or only a small number of air bubbles present in the composite membrane. Any air bubbles present in the curable composition preferably do not provide a passage way through the composite membrane. For some applications, a low amount of defects, so-called pinholes, are tolerable. An example of an application where a low amount of pinholes is allowable is a flow through capacitor.

The curable composition preferably comprises a compound comprising at least two curable groups, i.e. a cross-linking agent.

The curable composition preferably comprises a radical initiator e.g. a photoinitiator when cured by UV or visible radiation. When electron-beam (EB) radiation is applied a radical initiator is not required.

The curable composition optionally comprises a non-curable solvent (abbreviated to "solvent" hereafter). Such a solvent can be useful to reduce the viscosity of the curable composition. When used, the solvent is preferably an environmental friendly solvent such as water. A solvent can also improve the solubility of curable components of the curable composition and thereby increase its storage stability. For stable production conditions the curable composition is preferably a homogeneous mixture and preferably non-foamed.

Preferably as little solvent as possible is used in order to enhance the crosslink density of the resultant composite membrane and reduce swelling and to help achieve the low water-permeability mentioned below. Preferably the curable composition comprises 15 to 55 wt % solvent, more preferably 15 to 45 wt %, especially 15 to 40 wt %.

In a preferred embodiment, the composite membrane carries cationically or anionically charged groups. Preferably the curable composition comprises an anionic and/or a cationic monomer.

As such the membrane can be used as an ion exchange membrane.

A preferred curable composition comprises:
(i) 2.5 to 80 wt % of crosslinking agent(s) comprising at least two ethylenically unsaturated groups;
(ii) 4 to 75 wt % of compound(s) comprising one ethylenically unsaturated group and at least one anionic or cationic group;
(iii) 15 to 55 (preferably 15 to 45) wt % solvent; and
(iv) 0 to 10 wt % of free radical initiator.

In one embodiment the molar ratio of (i):(ii) is from 0.1 to 5, more preferably from 0.1 to 1.5.

When component (i) is free from anionic and cationic groups, the preferred amount of component (i) is 2.5 to 55 wt %

Another preferred curable composition comprises:
(i) 2.5 to 80 wt % of crosslinking agent(s) comprising at least two ethylenically unsaturated groups and optionally an anionic or cationic group;
(ii) 0 to 75 wt % (preferably 0 to 60 wt %) of compound(s) comprising one ethylenically unsaturated group and at least one anionic or cationic group;
(iii) 15 to 55 (preferably 15 to 45) wt % solvent; and
(iv) 0 to 10 wt % of free radical initiator;
provided that the curable composition comprises at least 4 wt % (preferably 20 to 80 wt %) in total of compounds comprising at least one anionic or cationic group and at least one ethylenically unsaturated group.

The compounds comprising at least one anionic or cationic group and at least one ethylenically unsaturated group will typically comprise component (i) (to the extent that component (i) comprises an anionic or cationic group) and also component (ii) when present.

Thus, in a preferred embodiment, the at least 4 wt % (preferably 20 to 80 wt %) in total of compounds comprising at least one anionic or cationic group and at least one ethylenically unsaturated group consists of the above-mentioned component (i) comprising an anionic or cationic group and, when present, the abovementioned component (ii). For example, the curable composition may comprise (i) 10 wt % of a crosslinking agent(s) comprising at least two ethylenically unsaturated groups and an anionic or cationic group and (ii) 10 wt % of compound(s) comprising one ethylenically unsaturated group and at least one anionic or cationic group and in this embodiment the curable composition comprises 20 wt % in total of compounds comprising at least one anionic or cationic group and at least one ethylenically unsaturated group.

Another still further preferred curable composition comprises:
(ia) 0 to 35 wt % of crosslinking agent(s) comprising at least two ethylenically unsaturated groups and being free from anionic and cationic groups;
(ib) 4 to 80 wt % of crosslinking agent(s) comprising at least two ethylenically unsaturated groups and at least one anionic or cationic group;
(ii) 0 to 60 wt % of compound(s) comprising one ethylenically unsaturated group and at least one anionic or cationic group;
(iii) 15 to 45 wt % solvent; and
(iv) 0.01 to 10 wt % of free radical initiator.

Preferably the curable composition has a pH of 0.1 to 12, more preferably 1 to 11. Preferably the curable composition comprises 15 to 40 wt % solvent.

For certain embodiments the amount of component (i) is preferably 3 to 50 wt %, more preferably 4 to 45 wt % and especially 5 to 25 or 35 wt %. If desired component (i) may comprise more than one crosslinking agent comprising at least two ethylenically unsaturated groups of which a part may comprise at least one anionic or cationic group (ib) and a part may be free from anionic and cationic groups (ia).

The ratio of component (i):(ii) may be selected depending on the desired properties for the resultant membrane, which may in turn depend on the intended use of the membrane.

When a membrane having low electrical resistance is desired, the amount of component (ii) and/or (ib) used in the composition is preferably high, while the amount of component (i) may be reduced in order to accommodate the higher amount of ionically charge component (ii).

Thus to prepare membranes having low electrical resistance the preferred amount of component (i) is 3 to 20 wt %, more preferably 4 to 18 wt %, especially 5 to 15 wt %, e.g. about 9 wt %. With this amount of component (i), one can still obtain a reasonably strong membrane with good permselectivity and without excessive swelling.

When a membrane having high permselectivity is desired, the amount of component (i) present in the composition will generally be chosen to be higher, preferably in an amount of 10 to 68 wt %, more preferably from 12 to 55 wt %, especially 12 to 28 wt % or 28 to 43 wt %. In this embodiment component (i) preferably comprises component (ib).

Component (i) preferably has two or three ethylenically unsaturated groups. The preferred ethylenically unsaturated groups are acrylate or, more preferably, acrylamide groups. In a preferred embodiment, component (i) comprises a crosslinking agent having two acrylamide groups.

The anionic group is preferably a sulphonic acid group (e.g. in the free acid or salt form) and the cationic group is preferably a quaternary ammonium group.

Preferably the molecular weight of one, or more preferably all, of the crosslinking agent(s) of component (i) satisfies the equation:

$$(W \times m) > \text{molecular weight of the crosslinking agent}$$

wherein:
m is the number of ethylenically unsaturated groups present in the crosslinking agent; and
W is 120, more preferably 105, especially 90, more especially 85 or 77.

The lower values of W mentioned above are preferred because the resultant crosslinking agents crosslink more efficiently than when W is higher. Furthermore, crosslinking agents of type (ia) having the lower values of W mentioned above have lower molecular weights, leaving room for higher amounts of component (ii) having ionic groups and thereby achieving a lower electrical resistance for the resultant composite membrane for the same level of crosslinking and permselectivity.

The crosslinking agent is preferably of the Formula (1):

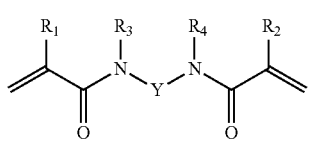

Formula (1)

wherein:
$R_1$ and $R_2$ are each independently H or methyl;
$R_3$ and $R_4$ are each independently H, alkyl, R3 and R4 together with the N groups to which they are attached and Y form an optionally substituted 6- or 7-membered ring; and
Y is an optionally substituted and optionally interrupted alkylene group.

$R_1$ and $R_2$ are preferably both H.

When $R_3$ or $R_4$ is alkyl it is preferably $C_{1-4}$-alkyl.

When $R_3$ and $R_4$ together with the N groups to which they are attached and Y form an optionally substituted 6- or 7-membered ring they preferably form a piperazine, homopiperazine or triazine ring.

The optional interruptions which may be present in Y are preferably ether or, more preferably, amino groups. Preferably Y is or comprises preferably groups of the formula $—(C_nH_{2n})—$ wherein n is 1, 2 or 3.

Preferably Y comprises at least one anionic or cationic group.

Examples of crosslinking agents which may be used as component (i) include N,N'-methylene bis(meth) acrylamide, N,N'-ethylene bis(meth)acrylamide, N,N'-propylene bis(meth)acrylamide, N,N'-butylene bis(meth)acrylamide, N,N'-(1,2-dihydroxyethylene)bis-(meth)acrylamide, 1,4-diacryoyl piperazine, 1,4-bis(acryloyl)homopiperazine, triacryloyl-tris(2-aminoethyl)amine, triacroyl diethylene triamine, tetra acryloyl triethylene tetramine, 1,3,5-triacryloylhexahydro-1,3,5-triazine and/or 1,3,5-trimethacryloylhexahydro-1,3,5-triazine. The term '(meth)' is an abbreviation meaning that the 'meth' is optional, e.g. N,N'-methylene bis(meth) acrylamide is an abbreviation for N,N'-methylene bis acrylamide and N,N'-methylene bis methacrylamide.

More preferably $R^3$ and $R^4$ are both H and Y is an optionally substituted $C_{1-3}$-alkylene group or an optionally substituted $—(C_{1-3}$-alkylene-$NR^5—$ $C_{1-3}$-alkylene)-group wherein $R^5$ is H or $O_{1-4}$-alkyl. Especially preferred crosslinking agents which may be used as component (i) are N,N'-methylene bis(meth) acrylamide, N,N'-ethylenebis (meth)acrylamide, N,N'-propylenebis(meth)acrylamide, N,N'-(1,2-dihydroxyethylene)bis-(meth)acrylamide, triacryloyl-tris(2-aminoethyl)amine and triacroyl diethylene triamine.

Component (ii) comprises one and only one ethylenically unsaturated group and in a preferred embodiment is preferably present in the composition in an amount of 10 to 65 wt %, more preferably 20 to 60 wt %, especially 25 to 57 wt %.

In other words, component (ii) cannot comprise more than one ethylenically unsaturated group.

In general the amount of component (ii) is as high as possible to maximise the electrical charge density in the membrane especially if component (i) is free from anionic and cationic groups. If desired more than one type of compound comprising one ethylenically unsaturated group and at least one anionic or cationic group curable ionic compound may be used as component (ii).

To obtain a composite membrane for use as an anion exchange membrane it is preferred that component (ii) comprises a quaternary ammonium group. Examples of such component (ii) include (3-acrylamidopropyl)trimethylammonium chloride, 3-methacrylamidopropyl trimethyl ammonium chloride, (ar-vinylbenzyl)trimethylammonium chloride, (2-(methacryloyloxy)ethyl)trimethylammonium chloride, [3-(methacryloylamino)propyl]trimethyl ammonium chloride, (2-acrylamido-2-methylpropyl)trimethylammonium chloride, 3-acrylamido-3-methylbutyl trimethyl ammonium chloride, acryloylamino-2-hydroxypropyl trimethyl ammonium chloride, N-(2-aminoethyl)acrylamide trimethyl ammonium chloride and mixtures comprising two or more thereof. Analogous compounds comprising other counterions, instead of chloride, may also be used.

To obtain composite membranes for use as a cation exchange membrane it is preferred that component (ii) comprises an acidic group, for example a sulpho, carboxy and/or phosphato group, and preferably an acrylate or acrylamide group. In view of the pH of the curable composition these groups will be often be partially or wholly in salt form. The preferred salts are lithium, ammonium, sodium and potassium salts and mixtures comprising two or more thereof. Examples of component (ii) comprising an acidic group include acrylic acid, beta carboxy ethyl acrylate, maleic acid, maleic acid anhydride, vinyl sulphonic acid, phosphonomethylated acrylamide, (2-carboxyethyl)acrylamide and 2-(meth)acrylamido-2-methylpropanesulfonic acid and salts thereof and mixtures comprising two or more thereof. The solvent content of the curable composition is preferably the minimum, or less than 5% more than the minimum, necessary to achieve the composition in the form of a homogeneous solution, while at the same time being in the range 15 to 55 wt %. Polar solvents, especially aqueous solvents, are preferred because these are particularly good at dissolving component (ii). Preferably at least 30 wt % of the solvent is water, with the balance comprising organic solvent. The organic solvent can be useful for providing a homogenous solution of all the components of the composition. The inclusion of an organic solvent may also have advantages in the process for preparing the composite membrane because many organic solvents will usefully reduce the viscosity and/or surface tension of the curable composition, making the manufacturing process easier in some respects. Preferably the solvent comprises at least 40 wt % water, more preferably at least 60 wt % water. Preferably component (iii) is present in an amount of 15 to 50 wt %, more preferably 15 to 45 wt %, especially 15 or 20 to 40 wt % and more especially 16 or 22 to 38 wt % solvent.

The organic solvent optionally comprises a single organic solvent or a combination of two or more organic solvents. Preferred organic solvents include $C_{1-4}$ alcohols (e.g. methanol, ethanol and propan-2-ol), diols (e.g. ethylene glycol and propylene glycol), triols (e.g. glycerol), carbonates (e.g. ethylene carbonate, propylene carbonate, dimethyl carbonate, diethyl carbonate, di-t-butyl dicarbonate and glycerin carbonate), dimethyl formamide, acetone, N-methyl-2-pyrrolidinone and mixtures comprising two or more thereof. A particularly preferred organic solvent is propan-2-ol. In one embodiment the organic solvent has a low boiling point e.g. a boiling point below 100° C. Solvents having a low boiling point can be easily removed by evaporation, avoiding the need for a washing step for removal of the solvent.

Being non-curable, the solvent does not co-polymerise with any of the other components of the curable composition The curable composition may comprise one or more than one free radical initiator as component (iv). For acrylamides, diacrylamides, and higher-acrylamides, type I photoinitiators are preferred. Examples of type I photoinitiators are as described in WO 2007/018425, page 14, line 23 to page 15, line 26, which are incorporated herein by reference thereto. Especially preferred photoinitiators include alpha-hydroxyalkylphenones, e.g. 2-hydroxy-2-methyl-1-phenyl propan-1-one and 2-hydroxy-2-methyl-1-(4-tert-butyl-) phenylpropan-1-one, and acylphosphine oxides, e.g. 2,4,6-trimethylbenzoyl-diphenylphosphine oxide, and bis(2,4,6-trimethylbenzoyl)-phenylphosphine oxide.

When a radical initiator is present in the composition, preferably a polymerization inhibitor is also included (e.g. in an amount of below 2 wt %). This is useful to prevent premature curing of the composition during, for example, storage. Suitable inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinoloxy, free radical, 4-hydroxy-2,2,6,6-tetramethyl-1-piperidinoloxy, free radical, 2,6-dinitro-sec-butylphenol, tris(N-nitroso-N-phenylhydroxylamine) aluminum salt, Omnistab™ IN 510 and mixtures comprising two or more thereof.

Optionally the curable composition comprises one or more non-curable salts. Such salts can help to dissolve poorly soluble crosslinking agents and provide surprisingly stable compositions, even with poorly soluble crosslinking agents such as N,N'-methylene bis(meth) acrylamide.

The non-curable salt can be any salt which is not capable of forming a covalent bond with the crosslinking agent under the conditions used to cure the composition. Typically the non-curable salt comprises an anionic group derived from an acid (especially an inorganic acid) and a cationic group (especially and inorganic cationic group).

The non-curable salt preferably has a solubility in water at 25° C. of at least 250 g/L, more preferably at least 400 g/L. Preferred non-curable salts are inorganic salts, for example inorganic lithium, sodium, potassium, ammonium, magnesium and calcium salts and mixtures comprising two or more such salts.

Preferred non-curable salts include lithium hydroxide, lithium chloride, lithium bromide, lithium nitrate, lithium iodide, lithium chlorate, lithium thiocyanate, lithium perchlorate, lithium tetrafluoroborate, lithium hexafluorophosphate, lithium hexafluoroarsenate, ammonium thiocyanate, ammonium chloride, ammonium iodide, ammonium nitrate, sodium chloride, sodium bromide, sodium nitrate, sodium thiocyanate, calcium nitrate, calcium thiocyanate, calcium bromide, calcium chloride, calcium perchlorate, calcium iodide, calcium tetrafluoroborate, calcium hexafluorophosphate, calcium hexafluoroarsenate, magnesium chloride, magnesium bromide, magnesium nitrate, magnesium thiocyanate, potassium thiocyanate, potassium chlorate, and mixtures comprising two or more such salts. Most preferred are lithium hydroxide, lithium chloride, lithium bromide, lithium nitrate, ammonium nitrate, sodium nitrate, calcium nitrate and mixtures comprising two or more such salts. When adjustment of pH is desired a hydroxide may be used as non-curable salt.

The non-curable salts preferably comprise a chaotropic anion (i.e. weakly hydrated anion), while the cation is preferably kosmotropic. The preferred chaotropic anions are those low in the Hofmeister series as can be experimentally determined by the order by their elution rate from a packed column comprising epichlorohydrin crosslinked dextran gel in beaded form (e.g. Sephadex® G-10) as described in detail in J. Biol. Chem., 261, 12477-12485 (1986). Preferred chaotropic anions are those that elute slower than or equal to chloride, e.g. thiocyanate, chlorate, perchlorate, chlorite, iodide, bromide, nitrate, chloride and nitrite. The anion preferably is other than sulphate, sulphite, phosphate and fluoride.

The non-curable salt preferably has a relatively low molecular weight (e.g. below 200, more preferably below 150, especially below 110, more especially below 90, even more especially below 70. Any waters of crystallisation, when present, are not taken into account when calculating the molecular weight of the non-curable salt. If used the curable composition preferably comprises 2 to 50 wt %, more preferably 2 to 40 wt % non-curable salt. When the crosslinking agent has low solubility in the solvent (e.g. a solubility of below 2 wt %), the composition preferably comprises a non-curable salt in an amount of 3 to 40 wt %, relative to the total weight of components (i) to (iv) mentioned above.

The curable composition may contain other components, for example acids, pH controllers, preservatives, viscosity modifiers, stabilisers, dispersing agents, antifoam agents, organic/inorganic salts, anionic, cationic, non-ionic and/or amphoteric surfactants, buffers and the like. The curable composition may of course contain further components not specifically mentioned or excluded above.

Preferably the curable composition is free from, or substantially free from, dyes and pigments. This is because for most applications there is no need to include dyes or pigments in the composition.

Preferably the cured composition is not an adhesive.

The method by which the poriferous support (often abbreviated to simply "support" in this specification) is moved is not particularly limited. Typically the support is continuously conveyed, e.g. a spool containing a long sheet of the support is unwound and conveyed at a desired speed and the curable composition is applied thereto while the support is moving.

The speed at which the support moves can be within a wide range, taking account of the time required for the curable composition to impregnate the support and the time required to cure the impregnated support. Typically however the poriferous support is moved at a speed of 2 to 100 m/minute, but a speed of 1 to 50 m/minute is preferred.

Preferably steps (ii) and (iii) are performed as the support is moving. The moving poriferous support impregnated with the curable composition may be provided by any suitable means, including on a continuous basis or batch-wise.

For example, a roll of the poriferous support may be unwound continuously and the curable composition is applied to the unwound support by a coating method. The resultant, impregnated support continues and at least some of the curable composition (e.g. the excess) is removed from the surface of the support in step (ii) of the process. The impregnated support may then be irradiated, thereby curing the composition present therein (step (iii)).

In one embodiment the curable composition is removed from the surface of the support by scraping the support with a flexible blade and/or by squeezing the support between a flexible blade and an opposing member.

Thus a preferred process the composite membrane is made by means of a manufacturing unit comprising:
a. a composition application station for impregnating the poriferous support with the curable composition;
b. a squeezing or scraping station for performing step (ii), said squeezing or scraping station optionally comprising a flexible blade or an (air)-knife and optionally an opposing member;
c. an irradiation source for performing step (iii);
d. a composite membrane collecting station; and
e. a means for moving the poriferous support impregnated with the curable composition.

The means for moving the poriferous support impregnated with the curable composition preferably moves the impregnated support to the squeezing or scraping station where step (ii) is performed and to the curing station where step (iii) is performed and then to the composite membrane collecting station.

The curable composition application station(s) may be located at an upstream position relative to the squeezing or scraping station, which in turn may be located at an upstream position relative to the irradiation source(s), and the irradiation source(s) is/are located at an upstream position relative to the composite membrane collecting station.

The temperature of the curable composition when it impregnates the poriferous support is preferably 25 to 80° C., e.g. 35, 40, 50 or 60° C. The preferred temperature may be determined depending on the solubility of the ingredients and on the desired viscosity of the curable composition.

With suitable coating techniques, the curable composition may be applied to a support moving at a speed of over 2 m/min, preferably over 5 m/min, more preferably over 10 m/min, e.g. more than 20 m/min, or even higher speeds, such as 30 m/min, 40 m/min or up to 100 m/min can be reached.

Optionally the process further comprises the step of heating the poriferous support impregnated with the curable composition. This heating can be useful in a number of ways. Firstly, the heating may be performed such that some of the solvent present in the curable composition is evaporated and the solids content of the curable composition present in the poriferous membrane is increased before curing step (iii). Lowering the solvent of the curable composition after it has been applied to the poriferous support has the advantage of achieving a higher solids content for the cure step and thereby increasing the crosslink density of the composite membrane and thus its strength.

By heating the poriferous support impregnated with the curable composition the viscosity of the curable composition is reduced, enhancing the impregnation efficiency, and the higher temperature may also enhance the cure speed in step (iii).

The heating may be achieved by any suitable method e.g. by irradiating the impregnated support using an infra-red lamp, a microwave or by convection heating.

When the non-curable solvent content of the curable composition is low enough, drying may be sufficiently accomplished in the curing step making a separate drying step unnecessary. However depending on the precise formulation of the curable composition, a separate drying step may be performed to produce a composite membrane which has optimal handling properties.

Suitable methods for impregnating the poriferous support with the curable composition include dip or foulard coating, spray coating, kiss coating, curtain coating, slot-die coating, knife coating, bar coating, meyer rod coating, nip coating, screen coating such as rotogravure and rotary screen coating, gap coating, comma bar coating or a combination of two or more of these methods, e.g. in a double-sided coating method. The most preferred method depends on the characteristics of the curable composition and the nature of the poriferous support.

For a kiss coating the contact time of the support with the coating roller (the dynamic contact line) may be tuned by altering the contact angle of the support with the coating roller, e.g. by implementing additional pass rollers before and after the coating roller.

Optionally wetting assist rollers are utilized and such rollers can usefully enhance the impregnation by enhancing the backside wetting. Thus the process optionally comprises the step of impregnating the poriferous support with the curable composition using one or more wetting assist rollers. Preferably the surfaces of the wetting assist rollers have a high surface energy, preferably higher than 100 mN/m, more preferably higher than 200 mN/m, especially higher than 1000 mN/m. For a good wetting, the surface energy of the wetting assist rollers is preferably at least 10 mN/m higher (more preferably at least 100 mN/m higher) than the surface tension of the curable composition.

The wetting assist roller is preferably made from metal, e.g. stainless steel or titanium, or from any material and coated with a suitable layer. The number of wetting assist rollers may be one, two, three or more as is needed to obtain the desired wetting.

Preferably in the impregnation step all air is expressed from the poriferous support, i.e. no air voids remain in the impregnated support.

In step (ii) at least some, preferably most or substantially all, of the curable composition is removed from the surface of the support. This step may also be used to improve the homogeneity of the distribution of the curable composition on the surface of the support. Furthermore, it may also assist impregnation by pushing more of the curable composition into the poriferous support.

The process of the present invention reduces the likelihood of composite membranes cracking and becoming uneven in thickness due to parts of the membrane surface breaking off. While not wishing to be bound by any particular theory, this beneficial effect might be explained as follows. In composite membranes comprising a poriferous support and a cured composition it is quite likely that these two components swell to differing degrees when they come into contact with water. The extent to which cured composition present in the pores of a poriferous support can swell is mechanically restricted to some extent by the pore walls and the structure and strength of the support. In contrast, any cured composition present on the surface of the support has no such mechanical restriction and it may swell freely in water according its intrinsic swelling properties. When the difference in degree of swelling between cured composition within the pores of the poriferous support and cured composition present on the surface of the poriferous support is large the cured composition present on the surface may partly break-off when the dry composite membrane comes into contact with water. This can affect the properties of the membrane, leading to weaknesses and differences in membrane properties across its surface area. Step (ii) of the present process reduces the amount of curable (and cured) composition present on the surface of the poriferous support and thereby reduces the likelihood of such problems arising. The present invention may offer analogous beneficial effects in processes for making composite membranes from non-aqueous components.

Surprisingly it was also found that the present process also reduces side-ways (lateral) shrinkage of the resultant composite membrane compared to when step (ii) was omitted.

Preferably step (ii) is performed such that the thickness (i.e. average thickness) of cured composition present on the poriferous support is very thin, e.g. less than 0.5 µm, more preferably less than 0.2 µm, especially less than 0.1 µm or even less than 0.05 µm.

The preferred process for removing some or all of the curable composition from the surface of the support in step (ii) comprises scraping the support with a flexible blade and/or by squeezing the support between a flexible blade (or an (air)-knife) and an opposing member, e.g. a roller, another (air)-knife, a plate or another blade (e.g. a flexible blade).

In a preferred embodiment some or all of the curable composition is removed from the surface of the support using a resiliently deformable doctor blade.

The abovementioned flexible blade techniques are preferred because they work well, providing a reasonable uniformity to the impregnated poriferous support even when the support is somewhat irregular in thickness, especially in the case of non-woven poriferous supports where non-uniformity is quite common.

The above flexible blade techniques can be particularly useful for obtaining a highly symmetrical, composite membrane even when the support has irregular thickness. Thus step (ii) is preferably performed such that the resultant composite membrane is symmetrical throughout its depth.

One or more than one flexible blade may be used.

When some or all of the curable composition is removed from the surface of the support by squeezing the support between a flexible blade or an (air)-knife and a roller it is preferred that the roller is rotated in a direction opposite to the direction in which the support is moving. This can reduce the risk of the curable composition being applied unevenly to the poriferous support and reduces the likelihood of the curable composition being drawn out of the support's pores which would create weak spots or defects in the resultant composite membrane.

It is also preferred for the roller to be rotated at a surface speed of less than 30% of the speed at which the support is moving over the said roller.

In various embodiments the roller (sometimes called a squeeze roller) moves at a lower speed in the same or opposite direction as the support or it may even be static. A static configuration may be achieved, for example, when using two flexible blades, two (air)-knives, an (air)-knife on a blade or a plate, a blade or an (air)-knife on a static roller or two static rollers.

For efficient removal of excess curable composition the blade preferably exerts a certain pressure on the impregnated support. The optimal pressure (blade load) depends on factors such as the material and thickness of the blade, the viscosity of the curable composition and the coating speed.

Preferably the process is performed such that in step (ii) the flexible blade applies a load to the impregnated support of between 10 and 10,000 N/m, more preferably between 50 and 5,000 N/m. When the curable composition has a viscosity below 150 mPa·s the load is preferably between 40 and 400 N/m e.g. 80, 100, 120 or 150 N/m.

Preferably step (ii) is performed such that some or substantially all air present in pores of the poriferous support is pressed out. In this way a particularly homogenous composite membrane may be obtained.

The flexible blade preferably has sufficient rigidity and/or stiffness to cause the curable composition to completely fill the pores of the poriferous support, ideally expelling most or all air bubbles therefrom. For example, the flexible blade is preferably not made from rubber or soft plastic material and stiffer and/or more rigid flexible blades are preferred. Preferably the Young's modulus of the part of the flexible blade which comes into contact with the poriferous support (e.g. its tip) is more than 500 MPa. For stiff materials such as metal the degree of flexibility is largely determined by the thickness of the part that comes into contact with the support, e.g. the tip.

The flexible blade is preferably made from metal or alloy, e.g. stainless steel or bronze. Such a metal or alloy may optionally carry a surface coating in order to modify its properties. The blade(s) may also be made of plastic, fibreglass, ceramic material, carbon fibre, or a combination of the foregoing. For instance the flexible blade(s) may be ceramic-tipped or made from a metal-ceramic composite. For metal flexible blades a thickness between 0.20 and 0.60 mm is usually preferred, optionally having a thin section of 0.1 to 0.15 mm; for other materials other blade thicknesses may be preferred.

The blade angle and position of the flexible blade(s) relative to the impregnated support and the supporting element may be tuned dependent on type and shape of the blade, type of support, opposing member and characteristics of the composition. A blade angle of between 20 and 45 degrees relative to the impregnated support is suitable in most cases but lower or higher values may also be used if desired.

Preferably the surface of the opposing member, e.g. a roller, has a high surface energy, preferably higher than 50 mN/m, more preferably higher than 60 mN/m. For a good wetting the surface energy of the opposing member is preferably at least 10 mN/m higher than the surface tension of the curable composition.

The orientation of the impregnated support during step (ii) and step (iii) may be selected freely and may be horizontal, vertical or at an angle between horizontal and vertical. When a combination of a flexible blade and a roller is used their position relative to the impregnated support may be chosen freely, i.e. the flexible blade may be on top of the impregnated support or below and the roller will be on the opposite side of the impregnated support. The optimal configuration may be determined based on the materials and process used.

Excess composition removed in step (ii) may be recycled and used to impregnate a downstream section of the poriferous support. If desired components of the curable composition, e.g. solvents, may be replenished to the tank containing the curable composition to keep the quality of the curable composition constant.

The irradiation in step (iii) preferably causes the composition to cure by radical polymerisation. Any irradiation source may be used which provides the wavelength and intensity of radiation necessary to cure the composition.

Preferably an irradiation intensity is selected which cures the composition in less 30 seconds, more preferably less than 10 seconds, especially less than 2 seconds.

If desired the support may be irradiated on more than one occasion in order to ensure the composition is fully cured, although generally this is not necessary.

The curing is preferably achieved thermally (e.g. by irradiating the support with infrared light) or, more preferably, by irradiating the support with ultraviolet light or an electron beam.

Irradiation by UV (or visible light) is preferred above thermal curing because of the much higher polymerization rates achievable with UV irradiation.

A preferred UV light source for curing is a D-bulb with an output of 600 Watts/inch (240 W/cm) as supplied by Fusion UV Systems or by GEW Ltd. Alternatives are the V-bulb and the H-bulb from the same suppliers.

When the curable composition is free from photo-initiators it can be cured in step (iii) using an electron-beam, e.g. using an exposure of 50 to 300 keV. Curing can also be achieved by plasma or corona exposure.

Preferably step (iii) begins within 3 minutes, more preferably within 60 seconds, from step (ii) being completed.

Preferably the support is irradiated for less than 30 seconds, more preferably less than 10 seconds, especially less than 3 seconds, more especially less than 2 seconds, e.g. between 0.1 and 1.5 seconds.

In the preferred continuous process the irradiation is performed continuously as the impregnated support moves relative to the irradiation source and the speed at which the impregnated support moves and the irradiation beam size determine the time period of irradiation.

Preferably the irradiation is with ultraviolet light. Suitable wavelengths are for instance UV-A (390 to 320 nm), UV-B (320 to 280 nm), UV-C (280 to 200 nm) and UV-V (445 to 395 nm), provided the wavelength matches with the absorbing wavelength of any photo-initiator included in the curable composition.

Suitable sources of ultraviolet light include a mercury arc lamp, carbon arc lamp, low pressure mercury lamp, medium pressure mercury lamp, high pressure mercury lamp, swirl-flow plasma arc lamp, metal halide lamp, xenon lamp, tungsten lamp, halogen lamp, laser and/or an ultraviolet light emitting diode. Particularly preferred are ultraviolet light emitting lamps of the medium or high pressure mercury vapour type. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized.

The exposure intensity is one of the parameters that can be used to control the extent of curing and this can also influence the final structure of the composite membrane. Preferably the impregnated support is irradiated with a total exposure dose of at least 1 J/m2, more preferably between 2 and 150 J/m2, especially between 3 and 80 J/m2, more especially between 4 and 15 J/m2 as measured by an High Energy UV Radiometer (UV PowerMap™ from EIT, Inc) in the UV-A and UV-B range indicated by the apparatus.

The impregnated support may be irradiated from both sides, simultaneously if desired. Irradiation from both sides can be a useful way of providing a symmetrical composite membrane.

To reach the desired exposure dose of irradiation at high coating speeds, more than one UV lamp per side may be used. When two or more lamps per side are used, all lamps may give an equal dose or each lamp may have an individual setting. For instance the first lamp may give a higher dose than the second and following lamps or the exposure intensity of the first lamp may be lower. Varying the exposure dose of each lamp may influence the polymer matrix structure and the final crosslink density. In a preferred embodiment the composition is cured by simultaneous irradiation from opposite sides using two or more irradiation sources, e.g. two lamps (one at each side) or four lamps (two at each side). The two or more irradiation sources preferably irradiate the support with the same intensity from each side. By using this symmetric configuration higher crosslinking efficiency can be achieved and curling of the composite membrane can be reduced or prevented.

Photoinitiators may be included in the curable composition, as mentioned above, and are usually required when irradiating the support with UV or visible light. Suitable photoinitiators are known in the art.

When the curable composition comprises a photoinitiator it is preferred that the composition is not exposed to UV or blue light prior to step (iii), e.g. steps (i) and (ii) are preferably performed under yellow light conditions.

Curing by irradiation with UV or electron beam is preferably performed at a temperature between 20 and 95° C.

The present process may be performed without sandwiching the poriferous support impregnated with the curable composition between inert films, e.g. polymeric sheets, aluminium foils, glass plates or any other temporary protection. This simplifies the process and makes it cheaper. In the present process such sandwiching is usually not needed because the effect of oxygen inhibition is small. A consequence of not using sandwiching is that the surface structure of the impregnated poriferous support is mainly determined by step (ii) and the surface of the resultant composite membrane may be somewhat rougher as a result. Surprisingly, for ion exchange membranes this can lead to a higher limiting current density when applied as separation membrane in electrodeionization or electrodialysis equipment. An additional advantage of scraping excess curable composition from the impregnated support, instead of sandwiching the impregnated support between sheets, is that excess curable composition is removed from the support much more efficiently. When applying sandwiching sheets more curable composition remains and this increases the chance of undesirable membrane curling, especially under wet conditions and when using non-woven supports.

Thus in a preferred embodiment, the process is performed without sandwiching the impregnated poriferous support between sheets (or plates) of (preferably irradiation-transparent) material, during steps (ii) and (iii). Furthermore, the process may be performed such that the impregnated poriferous support is in contact with oxygen during steps (ii) and (iii).

The claimed process may be used for the manufacturing of composite membranes for a wide variety of purposes, e.g. gas and vapour permeable membranes (e.g. for use as breathable fabrics) and ion permeable membranes.

The process may be used, for example, to prepare a gas-permeable membrane suitable for separating a first gas from a second gas or an ion-permeable membrane, comprising anionic or cationic groups, suitable for use in an ion exchange process.

According to a second aspect of the present invention there is provided a composite membrane obtained by the process of the first aspect of the present invention.

According to a third aspect of the present invention there is provided a composite membrane comprising a poriferous support and a cured composition. wherein:
(a) the poriferous support has a first and a second surface respectively on opposite sides thereof;
(b) the cured composition is present within the pores of the poriferous support;
(c) the cured composition has been obtained from curing a preferred curable composition as hereinbefore described; and
(d) when the cured composition extends from the pores to form a layer on one or both of said surfaces said layer has an average thickness of less than 0.5 µm.

For composite membranes comprising a poriferous support having a uniform, flat surface, the thickness of the layer is self-evident as being that part (if any) of the layer which sits on the surface of the poriferous support. The thickness of such a layer may be determined by examining a cross-section of the composite membrane using a scanning electron microscope. This is illustrated schematically in FIG. 1 where a poriferous support (1) has first and second surfaces on opposite sides. Cured composition (shown in grey) is present within and fills the pores of the support. The cured composition extends from the pores to form a layer of average thickness less than 0.5 μm on both of said surfaces.

For non-woven supports, the fibres or filaments making up the support may be present in quite a loose structure with some fibres or filaments being located nearer the surface than others. In this case, the thickness of the layer (if any) is measured outwards from the surface of the outermost fibres or filaments.

Figure 2:
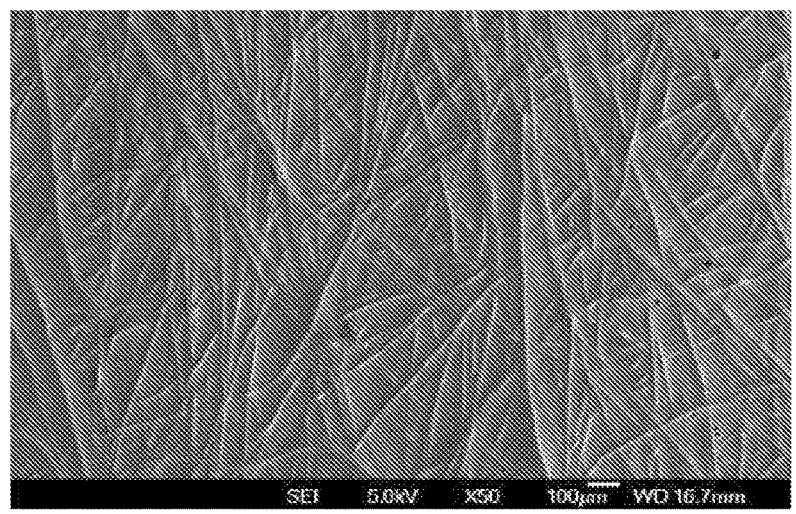
FIG. 2 is an electron microscope photograph of a composite membrane having a non-woven support.

FIG. 2 shows an electron microscope photograph of composite membrane according to the invention comprising such a non-woven support. Scraping has removed substantially all of the curable composition from the surface of the support. The cured, curable composition does not extend beyond the outermost fibres/filaments and therefore there is no layer (or substantially no layer) on one or both of said surfaces.

In a preferred embodiment of the third aspect of the present invention the cured composition does not extend from the pores to form a layer on one or both of said surfaces.

When the cured composition does extend from the pores to form a layer on one or both of said surfaces said layer preferably has an average thickness of less than 0.2 μm, more preferably less than 0.1 μm, especially less than 0.05 μm.

Composite membranes according to the third aspect of the present invention benefit from low curl.

The cured composition may be obtained by curing the aforementioned curable composition e.g. by any of the curing techniques described above.

Ion permeable membranes are useful in a number of applications, including electrodeionisation (EDI), continuous electrodeionisation (CEDI), electrodialysis (ED), electrodialysis reversal (EDR) and capacitive deionisation used in e.g. flow through capacitors (FTC) for the purification of water, Donnan or diffusion dialysis (DD) for e.g. fluoride removal or the recovery of acids, pervaporation for dehydration of organic solvents, fuel cells, electrolysis (EL) of water or for chlor-alkali production, and reverse electrodialysis (RED) where electricity is generated from two streams differing in salt concentration separated by an ion-permeable membrane.

Permeation of water through the membrane reduces its efficiency; a low permeability of water is preferred. Preferably the resultant composite membrane has a water permeability lower than $1\times10^{-9}$ m³/m²·s·kPa, more preferably lower than $1\times10^{-10}$ m³/m²·s·kPa.

The invention is now illustrated by the following non-limiting Examples.

General Test Methods

Permselectivity was measured by using a static membrane potential measurement. Two cells are separated by the membrane under investigation. Prior to the measurement the membrane was equilibrated in a 0.1 M NaCl solution for at least 12 hours. Two streams having different NaCl concentrations were passed through cells on opposite sides of the membranes under investigation. One stream had a concentration of 0.1M NaCl (from Sigma Aldrich, min. 99.5% purity) and the other stream was 0.5 M NaCl. The flow rate of both streams was 0.90 dm³/min. Two Calomel reference electrodes (from Metrohm AG, Switzerland) were connected to Haber-Luggin capillary tubes that were inserted in each cell and were used to measure the potential difference over the membrane. The effective membrane area was 3.14 cm2 and the temperature was 21° C.

When a steady state was reached, the membrane potential was measured ($\Delta V meas$)

The permselectivity ($\alpha$ (%)) of the membrane was calculated according the formula:

$$\alpha\ (\%)=\Delta V meas/\Delta V theor*100\%.$$

The theoretical membrane potential ($\Delta V theor$) is the potential for a 100% permselective membrane as calculated using the Nernst equation.

To compensate for day-to-day measurement fluctuations in all $\alpha$ (%) measurements an internal standard was included which was used to normalize the results. For testing cation exchange membranes the internal standard used was Neosepta CMX membrane from Tokuyama Soda; its $\alpha$ (%) value was determined to be 98%. For testing anion exchange membranes the internal standard used was Neosepta AMX membrane from Tokuyama Soda having an $\alpha$ (%) value of 92%.

Electrical resistance ER (ohm·cm2) was measured by the method described by Djugolecki et al, J. of Membrane Science, 319 (2008) on page 217-218 with the following modifications:
 the auxiliary membranes were CMX and AMX from Tokuyama Soda, Japan;
 a Cole Parmer masterflex console drive (77521-47) with easy load II model 77200-62 gear pumps was used for all compartments;
 the flowrate of each stream was 475 ml/min controlled by Porter Instrument flowmeters (type 150AV-B250-4RVS) and Cole Parmer flowmeters (type G-30217-90);
 the effective area of the membrane was 3.14 cm².

Wet Curling was determined by placing composite membrane samples of 15×15 cm in an 0.1 M NaCl solution for 30 minutes. Subsequently the samples were placed on a smooth surface at room temperature (21° C. and 50% RH), the height above the surface at each of the four corners was measured and the average height was calculated.

Viscosity was measured using a Physica Rheolab MC1 from Paar, equipped with a cylinder Z2, applying a speed of 200 rpm and at a temperature of 50° C.

Water permeability is determined as follows.

A membrane sample at least 21×21 cm in size was conditioned for 16 hours in a 0.1 M NaCl (20.45 g/3.500 L) solution.

The membrane was clamped between a perforated nylon support and a nylon ring forming an effective membrane surface of 333 cm².

On the unsupported side of the membrane a solution of 0.1 M NaCl was circulated and on the supported side a solution of 0.7 M NaCl (143.18 g/3.500 L). Circulation was achieved by a Masterflex console drive (77521-47) with easy load II model 77200-62 gear pumps at a rate of 0.5 L/min.

In the compartment filled with the 0.1M NaCl solution a light overpressure was created by connecting via a tube an open vessel with the liquid level 40 cm higher than the top side of the compartment. To the compartment filled with the 0.7M NaCl solution was connected a Bronkhorst LIQUI-FLOW® L13 digital mass flow meter that was positioned 10 cm below the bottom of the compartment. The water transport over the membrane was obtained by multiplying the flow meter value by a correction factor of 1.07.

Ingredients

MBA—is N,N'-methylene bisacrylamide from Sigma Aldrich.
AMPS—is 2-Acryloylamido-2-methylpropanesulfonic acid from Hang-Zhou (China).
BAMPS—is 1,1-bis(acryloylamido)-2-methylpropane-2-sulphonic acid, synthesized as described in U.S. Pat. No. 4,034,001.
ATMAC—is 3-acrylamidopropyl-trimethylammonium chloride from Kohjin, Japan.
HDMAP—is 2-hydroxy-2-methyl-1-phenyl-propan-1-one, a photoinitiator from Cytec.
LiOH—is lithium hydroxide monohydrate from Chemetall.
MeHQ—is hydroquinone monomethyl ether, a polymerisation inhibitor from Merck.
IPA—is 2-propanol from Shell (a solvent).
CL1—is $N^1,N^6$-Bis(3-acrylamidopropyl)-$N^1,N^1,N^6,N^6$-tetramethylhexane-1,6-diaminium bromide (a curable compound comprising at least two (meth)acrylic groups and a quaternary ammonium group), synthesized as described below.
Viledon® Novatexx™ 2597—is a poriferous support (non-woven polyamide material from Freudenberg Filtration Technologies).
Viledon® Novatexx™ 2473—is a poriferous support (non-woven polypropylene/polyethylene material from Freudenberg Filtration Technologies).
Viledon® Novatexx™ 2226-14E—is a poriferous support (non-woven polyolefine material from Freudenberg Filtration Technologies).

Synthesis of CL1

A solution of N-[3-dimethylamino)propyl]acrylamide (200 mL, 190 g, 1.22 mol) and 1,6-dibromohexane (93.4 mL, 147 g, 0.605 mol, 0.50 eq) in acetonitrile (1.0 L) was stirred under reflux temperature for 1 hour. The solid formed was filtered-off, washed with acetonitrile (2×0.3 L) and transferred to a flask with 4-methoxyphenol (75 mg, 0.605 mmol, 1000 ppm) and acetonitrile (300 mL). The solvent was removed in vacuo to give CL1 (353 g) as a hygroscopic white solid.

Preparation of Curable Compositions

Curable compositions CC1 to CC6 used are prepared by mixing the following ingredients (expressed in wt %) at 65° C.

TABLE 1

| Ingredient | CC1 | CC2 | CC3 | CC4 | CC5 | CC6 |
|---|---|---|---|---|---|---|
| ATMAC | 42.4 | 31.0 | 0 | 0 | 18.2 | 0 |
| CL1 | 0 | 0 | 0 | 0 | 49.2 | 0 |
| AMPS | 0 | 0 | 50.2 | 49.3 | 0 | 37.4 |
| BAMPS | 0 | 0 | 0 | 0 | 0 | 28.2 |
| MBA | 6.8 | 5.0 | 7.5 | 11.7 | 0 | 0 |
| HDMAP | 1.0 | 1.0 | 1.0 | 0.5 | 0.5 | 0.5 |
| Water + 2000 ppm MeHQ | 29.4 | 27.0 | 22.5 | 20.6 | 32.1 | 33.9 |
| IPA | 0 | 0 | 9.0 | 8.1 | 0 | 0 |
| LiOH•$H_2O$ | 0 | 0 | 10.0 | 9.8 | 0 | 0 |
| $LiNO_3$ | 20.4 | 0 | 0 | 0 | 0 | 0 |
| $Ca(NO_3)_2$ | 0 | 36.0 | 0 | 0 | 0 | 0 |
| Viscosity (mPa · s at 50° C.) | 60 | 65 | 42 | 46 | 51 | 55 |

Composite membranes were prepared using the following general methods. In each case the curable composition, poriferous support, impregnation method, step (ii) and resultant properties were as described in Table 2 below.

The resultant composite membranes were stored in a 0.1 M NaCl solution for at least 12 hours before further testing.

Examples 1 to 11

Process 1 for Making Composite Membranes—Flexible Blade

The poriferous support was placed in a roll unwinding station and impregnated with a curable composition at a composition application station (either a dip coating station or a kiss coating (roll coating) station). The temperature of the curable composition was 52° C. The resultant poriferous support impregnated with the curable composition was moved over three wetting assist rollers (stainless steel, diameter 8 cm) and then to a squeezing station comprising a flexible blade (a stainless steel doctor blade, length 65 mm, thickness 250 μm) and a stainless steel backing roller, diameter 10 cm. The doctor blade was applied to the impregnated poriferous support at a load of 100N/m with a blade angle of 29 degrees. After excess curable composition had been removed from the impregnated support by the squeezing station, the impregnated support was irradiated using an Isocure 1W curing system from GEW (EC) Ltd, Crawley, UK, equipped with two D-bulbs, one on each side of the support. The irradiation was performed at 50% intensity (120 W/cm) applying a total dose of 10 J/m2 (5 J/m2 per side) with the D-bulbs focussed on the impregnated support. The resultant composite membrane was wound onto a spool at the composite membrane collecting station. During the process, the poriferous support was wound continuously from a spool at the roll unwinding station to a spool at the composite membrane collecting station via the composition application station, the squeezing or scraping station, through the light emitted by the irradiation source at a speed of about 5 m/min. The curing started about 35 seconds after the curable composition was applied to the support. There was substantially no layer of cured composition on the surface of the poriferous support (average thickness less than 0.05 μm). The lateral shrinkage was less than 0.4%.

Comparative Example 1

Process 2 for Making Composite Membranes

Levelling Using a Wire Wound Rod Coater to a Thickness of 4 Micrometers

The curable compositions (at a temperature of 50° C.) were applied to an aluminium underground carrier using a 150 μm wire wound bar, at a speed of approximately 5 m/min by hand, followed by application of an A4 sized poriferous support (Novatexx™ 2597) to the composition whereby the composition impregnated the poriferous support. Subsequently about 9 ml of curable composition was applied to one short side of the poriferous support in excess. The curable composition was levelled using a wire wound rod coater to a thickness of 4 micrometers whereby excess curable composition was removed from the surface of the impregnated support. The curing was performed using a Light Hammer LH6 irradiator from Fusion UV Systems fitted with a D-bulb working at 100% intensity. The support was moved at a speed of 30 m/min (single pass). The irradiation time was 0.47 seconds. The cured composition extended from the pores forming layers on both surfaces of the poriferous support. The thickness of the layer was between 0.5 and 5 μm on one surface and between 7 and 22 μm on the other surface of the poriferous support. The variation in thickness was caused by the unevenness of the support. A shrinkage in the cross-machine direction of about 2% was observed.

Comparative Examples 2 AND 3

Process 3 for Making Composite Membranes

Fixed Squeeze Gap Instead of Flexible Blade

Process 3 was identical to Process 1 described above except that the squeezing station comprised two rollers having a fixed squeeze gap of 230 μm through which the impregnated poriferous support was passed (instead of a flexible blade and backing roller). Both rollers were rotated in the forward direction at the same speed as the web.

Results for Examples 1 to 11 and Comparative Examples 1 to 3

The properties of membranes obtained from Examples 1 to 11 and Comparative Examples 1 to 3 were measured and are shown below in Table 2:

TABLE 2

| | Ex. 1 | Ex. 2 | Ex. 3 | Ex. 4 | Ex. 4 | Ex. 6 | Ex. 7 | Ex. 8 | Ex. 9 |
|---|---|---|---|---|---|---|---|---|---|
| Curable Composition | CC3 | CC3 | CC3 | CC1 | CC2 | CC3 | CC4 | CC5 | CC6 |
| Poriferous Support | 2597 | 2597 | 2597 | 2597 | 2597 | 2226-14E | 2597 | 2473 | 2473 |
| Impregnation Process | kiss | kiss | kiss | dip | dip | dip | dip | dip | dip |
| Speed of support movement (m/min) | 5 | 5 | 5 | 5 | 5 | 5 | 5 | 5 | 5 |
| Step (ii) excess curable composition removed by: | | | | Process 1 - Flexible blade | | | | | |
| Relative speed of roller rotation * | −20% | −20% | 0% | −20% | −20% | −20% | −20% | −20% | −20% |
| Defects/m² | 0 | 0 | 0 | 0 | 0 | 0 | 1 | 0 | 0 |
| Wet curling (mm) | 11 | 4 | 16 | 7 | 3 | 12 | 15 | 9 | 11 |
| Permselectivity (%) | 93.5 | 94.6 | 94.0 | 89.9 | 90.4 | 95.0 | 94.6 | 94.0 | 92.1 |
| Electrical resistance (ohm · cm²) | 2.8 | 2.8 | 2.7 | 1.2 | 1.3 | 3.0 | 3.5 | 0.7 | 2.0 |
| Permeability (m³/m² · s · kPa) | $4.5 \times 10^{-11}$ | $4.4 \times 10^{-11}$ | $4.3 \times 10^{-11}$ | $1.6 \times 10^{-11}$ | $2.1 \times 10^{-11}$ | $1.7 \times 10^{-11}$ | $3.8 \times 10^{-11}$ | $2.5 \times 10^{-11}$ | $2.9 \times 10^{-11}$ |

| | Ex. 10 | Ex. 11 | CEx. 1 | CEx. 2 | CEx. 3 |
|---|---|---|---|---|---|
| Curable Composition | CC3 | CC3 | CC3 | CC3 | CC3 |
| Poriferous Support | 2597 | 2597 | 2597 | 2597 | 2597 |
| Impregnation Process | kiss | dip | by Process 2 | kiss | dip |
| Speed of support movement (m/min) | 5 | 5 | 30 | 5 | 5 |
| Step (ii) excess curable composition removed by: | Flexible blade | Flexible blade | Process 2 - 4 μm wire wound rod coater | | Process 3 - two roller fixed squeeze gap |
| Relative speed of first roller rotation * | NA (flexible blade) | NA (flexible blade) | NA (wire wound rod) | +100% | +100% |
| Relative speed of opposing roller rotation * | +100% | +100% | NA (wire wound rod) | +100% | +100% |
| Defects/m² | 2 | 0 | 0 | 30 | 32 |

TABLE 2-continued

| | | | | | |
|---|---|---|---|---|---|
| Wet curling (mm) | 41 | 50 | forms a roll | 26 | 19 |
| Permselectivity (%) | 95.0 | 94.7 | 94.8 | 93.2 | 92.0 |
| Electrical resistance (ohm · cm$^2$) | 2.8 | 2.6 | 3.0 | 2.1 | 2.4 |
| Permeability (m$^3$/m$^2$ · s · kPa) | 4.2 × 10$^{-11}$ | 4.6 × 10$^{-11}$ | 5 × 10$^{-11}$ | 4.6 × 10$^{-11}$ | 4.5 × 10$^{-11}$ |

In Comparative Example 1 (CEx. 1) the wet curling is very severe resulting in a roll after wetting. Comparative Examples 2 and 3 (CEx. 2 and 3) resulted in a high number of defects. In Examples 1 to 11, the thickness of cured composition present on the poriferous support was very thin (<0.5 µm). In CEx. 1 the thickness of cured composition present on the poriferous support was about 4 µm.

The invention claimed is:

1. A process for making a composite membrane comprising the steps:
   (i) providing a moving poriferous support impregnated with a curable composition comprising monomers and/or oligomers that can be cured by irradiation to form a polymeric resin, wherein the composition is present in the pores of the support and on a surface of the support;
   (ii) scraping the support with a flexible blade and/or squeezing the poriferous support between a flexible blade and an opposing member and thereby removing at least some of the curable composition from the surface of the support; and
   (iii) after performing step (ii), irradiating the support, thereby curing the composition present therein;
   wherein steps (ii) and (iii) are performed as the support is moving;
   wherein the composite membrane exhibits a wet curling value not exceeding about 50 mm, wherein the wet curling value is determined by placing a composite membrane sample of 15 ×15 cm in a 0.1 M NaCl solution for 30 minutes followed by placing the sample on a smooth surface at 21° C. and 50% relative humidity, and determining the average value of the height above the surface at each of the four corners of the sample; and
   wherein an average number of surface defects in the composite membrane does not exceed about 2/m$^2$.

2. The process according to claim 1 wherein step (ii) is performed such that the thickness of cured composition present on the poriferous support is less than 0.5 µm.

3. The process according to claim 1 which is performed without sandwiching the impregnated poriferous support between sheets during curing step (iii).

4. The process according to claim 1 wherein the opposing member comprises a roller, an (air)-knife, a plate or a flexible blade.

5. The process according to claim 4 wherein the roller is rotated at a surface speed of less than 30% of the speed at which the support is moving over said roller.

6. The process according to claim 5 wherein the Young's modulus of the part of the flexible blade which comes into contact with the poriferous support is more than 500 MPa, step (iii) comprises irradiating both sides of the support with an electron beam or ultraviolet light, the curable composition comprises a photoinitiator and the curable composition comprises an anionic and/or a cationic monomer.

7. The process according to claim 6 wherein the support has a surface energy of at least 10 mN/m higher than the surface tension of the curable composition.

8. The process according to claim 4 wherein the roller moves at a lower speed in the same or opposite direction as the support or is static.

9. The process according to claim 1 wherein the Young's modulus of the part of the flexible blade which comes into contact with the poriferous support is more than 500 MPa.

10. The process according to claim 1 wherein step (iii) comprises irradiating both sides of the support.

11. The process according to claim 1 wherein step (iii) comprises irradiating the support with an electron beam or ultraviolet light.

12. The process according to claim 1 wherein the curable composition comprises a photoinitiator.

13. The process according to claim 1 wherein the curable composition comprises an anionic and/or a cationic monomer.

14. The process according to claim 13 wherein the support has a surface energy of at least 10 mN/m higher than the surface tension of the curable composition.

15. The process according to claim 1 wherein the support has a surface energy of at least 10 mN/m higher than the surface tension of the curable composition.

16. The process according to claim 1 wherein the composite membrane is an ion-permeable membrane suitable for use in an ion exchange process.

17. The process according to claim 1 wherein the Young's modulus of the part of the flexible blade which comes into contact with the poriferous support is more than 500 MPa, step (iii) comprises irradiating both sides of the support with an electron beam or ultraviolet light, the curable composition comprises a photoinitiator and the curable composition comprises an anionic and/or a cationic monomer.

* * * * *